(No Model.)

R. M. HUNTER.
ELECTRIC RAILWAY.

No. 402,832. Patented May 7, 1889.

WITNESSES:
David S. Williams

INVENTOR:

N. PETERS, Photo-Lithographer, Washington, D. C.

UNITED STATES PATENT OFFICE.

RUDOLPH M. HUNTER, OF PHILADELPHIA, PENNSYLVANIA.

ELECTRIC RAILWAY.

SPECIFICATION forming part of Letters Patent No. 402,832, dated May 7, 1889.

Original application filed December 15, 1888, Serial No. 293,665. Divided and this application filed March 21, 1889. Serial No. 304,167. (No model.)

*To all whom it may concern:*

Be it known that I, RUDOLPH M. HUNTER, of the city and county of Philadelphia, and State of Pennsylvania, have invented an Improvement in Electric Railways, (Case 90,) of which the following is a specification.

My invention has reference to electric railways; and it consists of certain improvements fully set forth in the following specification and shown in the accompanying drawings, which form part thereof.

This application (Case 90) is a division of my application, Serial No. 293,665, filed December 15, 1888.

My invention contemplates the employment of a common conduit structure arranged between the two railway-tracks. By this construction the collector is arranged upon the outside of the wheel-base, and preferably supported by the axle-boxes or axles and independent of the car-body, which in practice is supported on springs. The conduit may have one or two slots and one or two pairs of conductors, which may be insulated from the conduit; or, if preferred, one of the conductors may be electrically connected with the conduit and tracks.

It is immaterial to my invention whether the conduit has more than one slot and more than one conductor, though I prefer it to be made with two slots and two pairs of conducting-surfaces. In this connection I find it desirable to arrange the slots of the conduit at the highest parts of the road-bed and let the tracks slope away upon either side, so as to cause the water and slush to run to the gutters of the street, and thereby keep the conduit clean. The conduit structure may be formed in any suitable manner, though I prefer to make it of cast-iron yokes supporting the slot-irons and adjacent rails of the two tracks and filled in with concrete or masonry. The outer rails may be tied to the yokes or their rails, and thus be prevented from spreading.

I do not limit myself to the details set out in this specification, as they may be greatly modified without departing from the spirit of my invention.

Figure 1:
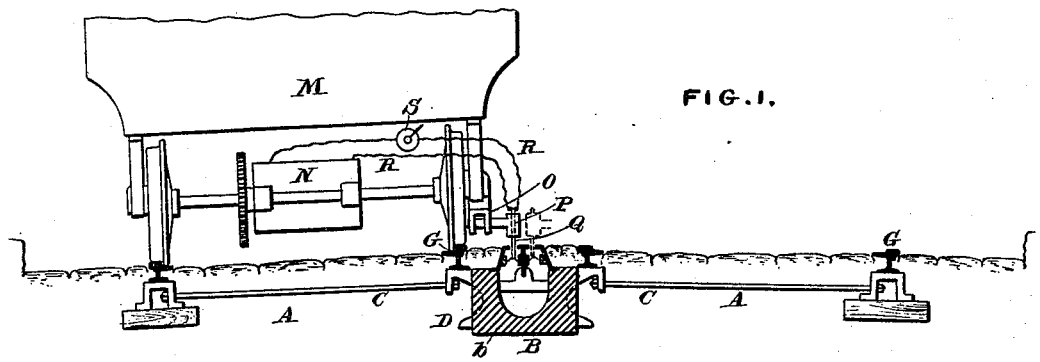
Figure 3:
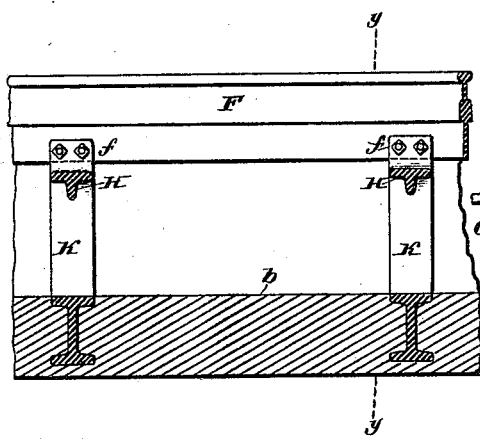
Figure 2:
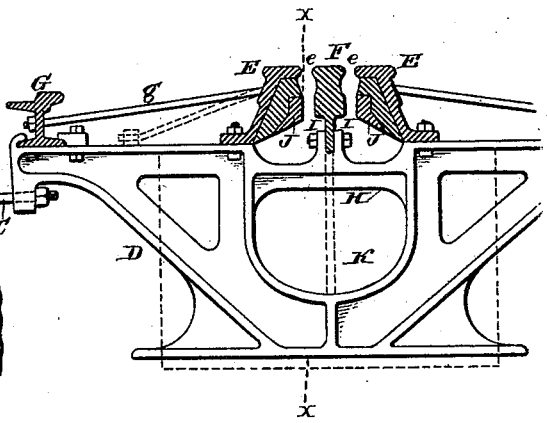
Figure 4:
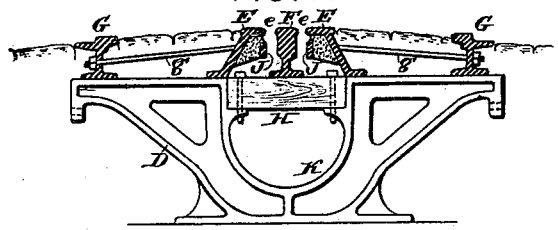
Figure 5:
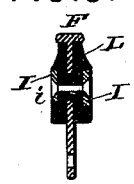

In the drawings, Figure 1 is a cross-section of a two-track electric railway embodying my invention. Fig. 2 is a cross-section of the conduit. Fig. 3 is a longitudinal section of Fig. 2 on line *x x*. Fig. 4 is a cross-section of a modified form of conduit, and Fig. 5 is a detail of part of the slot-irons and attached conductors.

A A are the two tracks, having the rails G. These tracks are separated a short distance and slope away to each side, so as to cause the rain-water and slush to run from their adjacent parts toward the gutters of the street.

B is a conduit, of any suitable construction, arranged between the adjacent rails of the two tracks. As shown, it is formed of cast-iron yokes D, which are more or less U-shaped, and support not only the slot-irons E E and F, but also support the adjacent rails G of the two tracks. The outer or more distant rails of the two tracks are tied to the conduit-yokes and thus to the inner rails by tie-rods C C.

The slot-irons E approach a central slot-iron of T shape supported on a cross-bracket, H, in the yoke, and are held in adjustment by being tied to the rails G, as shown at *g*, or to the yokes direct, as indicated in dotted lines in Fig. 2. The positive conductors J are supported by the slot-irons E, from which they are suitably insulated. The conductors I are either made integral with the slot-iron F, as shown in Figs. 2 and 4, or electrically separate therefrom, as indicated in Fig. 5, in which L represents the insulation and *i* a rivet for uniting the conductors on each side of the slot-iron.

In Fig. 2 the slot-iron F and its conductors I are electrically connected with the yokes D and rails G, and the entire iron structure acts as the return to the central station. In Fig. 4 the central slot-rail, F, and its conductors are insulated from the conduit and rails.

The conduit proper is formed of cement or concrete or masonry, *b*, which extends from yoke to yoke and through and around them, forming a monolithic structure.

It is evident that the form of conduit shown has two upper compartments containing the electrical conductors and a single lower or drainage compartment common to both of the electrical or upper compartments. I, however, do not confine myself to this construction, as the conduit may be divided longitudinally, as indicated in dotted lines in Fig. 2, forming two drainage conduits or compartments. It is also clear that in place of a double conduit a single conduit may be employed upon the outside of the track-bed of the railway, and this conduit may have one or more conductors and the rails may act as returns.

M represents the electrically-propelled car, having the propelling electric motor N. The collector Q, which extends down into the conduit through the slots thereof, is supported by the frame P free to move laterally in a guide, O, secured to the axle-box or axle of the car and preferably independent of the car-body, which should be supported upon springs.

R is the motor-circuit, and S is the electric regulator. This collector is upon the outside of the car and on the side adjacent to the parallel track which acts as the return-track for the car, and such collector is free to move laterally to compensate to any inequalities in the slots or their parallelism with respect to the track. This collector may be made in various ways.

In this application I do not claim the upper and lower compartments, nor the employment of yokes with slot-irons having the conductors arranged within the space bounded by the slot-irons, nor the arrangement of the conduit to the highest part of the road-bed, nor a conduit upon the outside of a road-bed, nor the collector carried by the axle-boxes and upon the outside of the wheel-base, as these features form subject-matter of my applications No. 277,311, of 1888, No. 285,295, of 1888, and No. 204,583, of 1886.

Any matters herein set out but not claimed and not specified above as in my other applications are not dedicated to the public, but form subject-matter of my application No. 293,665, of 1888, of which this is a division.

Having now described my invention, what I claim as new, and desire to secure by Letters Patent, is—

1. The combination of two tracks sloping downward and away from each other, with a slotted conduit arranged between them at the highest part, and one or more electrical conductors arranged within the conduit.

2. The combination of a slotted conduit, having iron yokes and slot-irons, with two tracks in which the adjacent rails of each track are secured to the conduit-yokes, and ties between the slot-irons and yokes or rails.

3. The combination of a slotted conduit, having iron yokes, with two tracks in which the adjacent rails of each track are secured to the conduit-yokes, and ties connecting the outer rails of the respective tracks with the yokes or inner rails supported thereby.

4. The combination of two railway-tracks with a conduit arranged between them, having two slots and a single drainage-compartment at the lower parts, and an insulated electrical conductor corresponding to each slot.

5. The combination of two railway-tracks with a conduit arranged between the adjacent rails, said conduit having two slots and two compartments in its upper part and a single drainage-compartment in its lower part, and a bared electric conductor in each of said compartments and insulated from the conduit.

6. The combination of two railway-tracks, a slotted conduit arranged between them, an electric conductor within said conduit, a traveling vehicle, and a current-collecting device carried by the vehicle upon the axles or their boxes independent of the car-body and outside of its wheel-base and making contact with the conductor within the conduit.

7. The combination of a railway-track arranged on an incline, so as to bring one rail higher than the other, with a slotted conduit having an electric conductor arranged to the outside of the track and adjacent to the highest rail.

8. The combination of two railway-tracks, a slotted conduit arranged between them and mechanically connected to the said tracks, and one or more electric conductors within the conduit.

9. In an electric-railway conduit, the combination of two upper compartments having slots, and a single lower drainage-compartment common to both upper compartments, and an electric conductor within each of said upper compartments.

10. An electric-railway conduit formed of a series of yokes united by side slot-irons, E, and a central slot-iron, F, and having the lower part formed of concrete or its equivalent, and an electric conductor within the conduit and located within the space bounded by each of the slot-irons E and F.

11. An electric-railway conduit formed of a series of yokes united by side slot-irons, E, and a central slot-iron, F, and having the lower part formed of concrete or its equivalent, an electric conductor within the conduit and located within the space bounded by each of the slot-irons E and F, in which the central slot-iron, F, forms an electric conductor.

12. An electric-railway conduit formed of the yokes having united side slot-irons, E, and central slot-iron, F, which also forms an electric conductor, and two separate insulated conductors connected to the side slot-irons.

13. An electric-railway conduit formed of the yokes combined with uniting side slot-irons, E, and central slot-iron, F, which also forms an electric conductor.

In testimony of which invention I hereunto set my hand.

RUDOLPH M. HUNTER.

Witnesses:
ERNEST HOWARD HUNTER,
E. M. BRECKINREED.